(12) United States Patent
Tokuda et al.

(10) Patent No.: US 12,313,205 B2
(45) Date of Patent: May 27, 2025

(54) CLOSING PLUG AND FLUID CONTROL DEVICE

(71) Applicant: FUJIKIN INCORPORATED, Osaka (JP)

(72) Inventors: Ichiro Tokuda, Osaka (JP); Tsuyoshi Tanikawa, Osaka (JP); Yukio Minami, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 18/033,900

(22) PCT Filed: Aug. 16, 2021

(86) PCT No.: PCT/JP2021/029855
§ 371 (c)(1),
(2) Date: Apr. 26, 2023

(87) PCT Pub. No.: WO2022/091526
PCT Pub. Date: May 5, 2022

(65) Prior Publication Data
US 2023/0392741 A1    Dec. 7, 2023

(30) Foreign Application Priority Data

Oct. 30, 2020 (JP) ................................. 2020-182009

(51) Int. Cl.
  *F16L 55/11*    (2006.01)
  *F16J 13/12*    (2006.01)
  *F16K 27/00*    (2006.01)
(52) U.S. Cl.
  CPC ............... *F16L 55/11* (2013.01); *F16J 13/12* (2013.01); *F16K 27/003* (2013.01)

(58) Field of Classification Search
  CPC ..... F16L 55/11; F16L 55/1108; F16K 27/003; F16J 13/12
  See application file for complete search history.

(56) References Cited

U.S. PATENT DOCUMENTS 5,291,842 A * 3/1994 Sallstrom ............... F16J 15/062
                                                  111/127
5,676,174 A * 10/1997 Berneski, Jr. ....... F16L 55/1152
                                                    73/49.8
(Continued)

FOREIGN PATENT DOCUMENTS

| CN | 206555503 U | 10/2017 |
| JP | H02-163579 A | 6/1990 |

(Continued)

OTHER PUBLICATIONS

International Search Report mailed Oct. 26, 2021, issued for PCT/JP2021/029855 and English translation thereof.

*Primary Examiner* — Marina A Tietjen (57) ABSTRACT

Provided is a closing plug capable of easily closing an open end of a flow passage without concern of scale. The closing plug includes: a gasket configured to come into contact with an annular projection formed in a step portion inside the open end of the flow passage of a flow passage block; a columnar pressing member formed by cutting out an inner side of a pressing surface so as to press a peripheral edge portion of the gasket; and a closing plug screw configured to be screwed into a female screw formed in an inner peripheral surface on an open end side from the step portion and press the pressing member toward the gasket by movement caused by screwing.

20 Claims, 6 Drawing Sheets

(56) References Cited

U.S. PATENT DOCUMENTS

| | | | |
|---|---|---|---|
| 6,135,155 A | 10/2000 | Ohmi et al. | |
| 2013/0001891 A1* | 1/2013 | Tower | F02M 55/005 |
| | | | 277/590 |
| 2016/0369903 A1* | 12/2016 | Kitano | F16K 27/003 |
| 2017/0234438 A1* | 8/2017 | Tanikawa | F16K 1/523 |
| | | | 251/294 |
| 2018/0087678 A1* | 3/2018 | Tokuda | F16K 7/17 |
| 2018/0119657 A1* | 5/2018 | Suzuki | F02M 55/02 |
| 2019/0009353 A1* | 1/2019 | Watanabe | H01L 21/3065 |
| 2020/0050221 A1 | 2/2020 | Hiramatsu et al. | |
| 2020/0248310 A1 | 8/2020 | Aikawa et al. | |

FOREIGN PATENT DOCUMENTS

| | | | | |
|---|---|---|---|---|
| JP | H08-326943 A | | 12/1996 | |
| JP | H10-169881 A | | 6/1998 | |
| JP | 2004308791 A | * | 11/2004 | |
| JP | 2019-178689 A | | 10/2019 | |
| JP | 2019173891 A | * | 10/2019 | |
| JP | 2020003249 A | * | 1/2020 | |
| JP | 6718456 B2 | | 7/2020 | |
| WO | WO-2016175077 A1 | * | 11/2016 | F02M 55/004 |
| WO | 2018/199063 A1 | | 11/2018 | |
| WO | 2019/044541 A1 | | 3/2019 | |

* cited by examiner

CLOSING PLUG AND FLUID CONTROL DEVICE

TECHNICAL FIELD

The present invention relates to a closing plug, and more particularly, to a closing plug that closes a flow passage end, without being attached with a fluid control apparatus such as a valve, of a flow passage block attached with a valve or the like; and to a fluid control device including a flow passage block attached with a fluid control apparatus.

BACKGROUND ART

A flow passage block attached with a fluid control apparatus has a flow passage formed from surfaces of a cube, whose open ends are provided with a fluid control apparatus or a joint. Among the open ends of the flow passage bored in the flow passage block, positions without being attached with a fluid control apparatus or a joint are designed to be as few as possible, but about one or two positions exist. It is necessary to attach closing plugs to these open ends so that fluid flowing through the inside does not leak to the outside.

In general, the open end, without being attached with an apparatus, of the flow passage in the flow passage block is provided with a gasket pressed by a metal lid member, and is sealed by attaching the lid member using welding. However, in welding, scale is formed on the weld. For this reason, the scale needs to be removed by descaling operation. In particular, scale formed on an inner surface of the weld decreases corrosion resistance of a pipe joint, and molten metal separated from the scale may become floating particles and fall into a flow passage formed inside the pipe joint. Thus, the descaling operation for removing scale from the inner surface of the weld needs to be conducted securely.

Figure 5A:
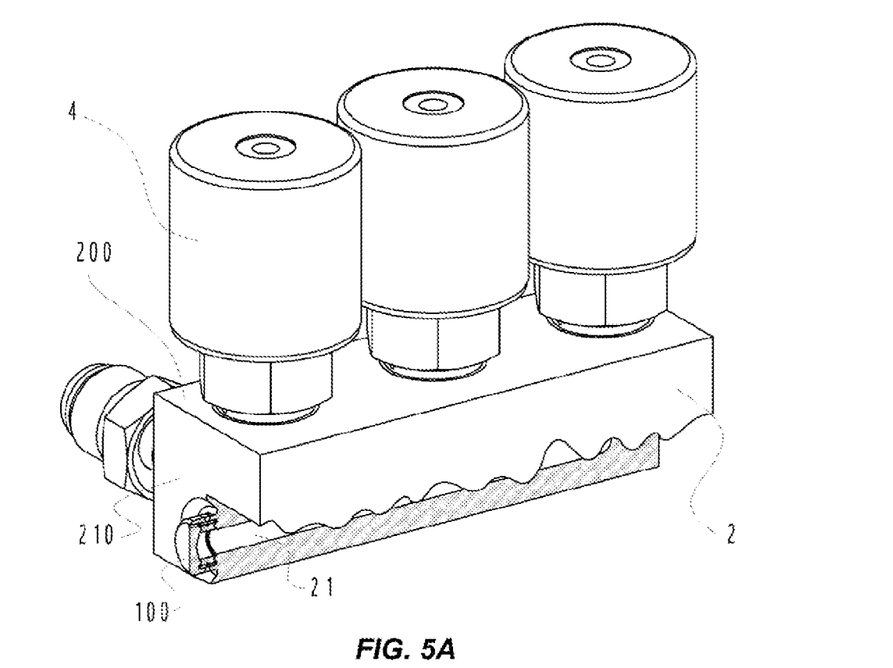
FIG. 5A is a perspective view of a partly cut-out cross section of a flow passage block mounted with a fluid control apparatus.
Figure 5B:
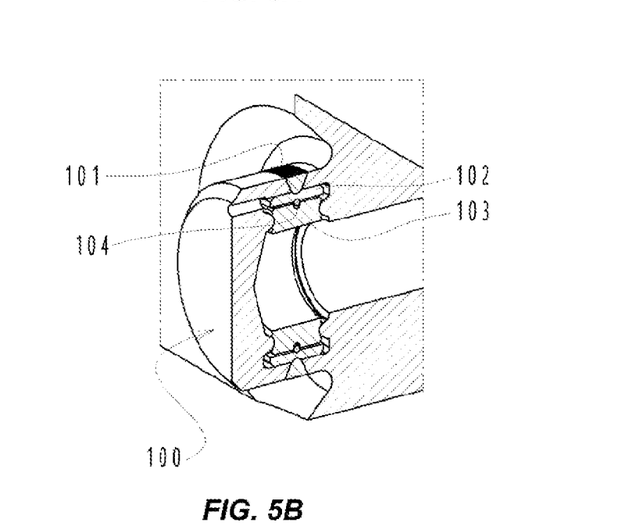
FIG. 5B is an enlarged view of a closing plug portion.

For this reason, in relation to a closing plug 100 to be attached to an opening of a side surface 210 of a block 2 having a fluid control apparatus 4 as shown in FIG. 5A and FIG. 5B disposed on an upper surface 2a thereof and having a flow passage 21 therein, the present applicant has invented a closing plug (pipe member) in which a heat transmission preventing member 102 is locked to an outer peripheral surface of a gasket 103 via a stop ring 104 so as to prevent direct heat transfer to the gasket 103 from the heat transmission preventing member 102 in contact with a welded portion 101 (see PTL 1).

CITATION LIST

Patent Literature

PTL 1: JP6718456B

SUMMARY OF INVENTION

Technical Problem

However, among the open ends of the flow passage of the block, the positions that need to be closed are not limited to one position. In a case of a plurality of positions, welding work requires much time, and it is difficult to completely eliminate a risk of the scale.

The invention has been made in view of the above problem, and an object of the invention is to provide a closing plug capable of easily closing an open end of a flow passage without concern of scale, and a fluid control device including a flow passage block attached with a fluid control apparatus.

Solution to Problem

A closing plug according to the invention made to solve the above problem is a closing plug for closing an open end of a flow passage of a flow passage block attached with a fluid control apparatus, and includes:
- a gasket configured to come into contact with an annular projection formed in a step portion inside the open end of the flow passage;
- a columnar pressing member formed by cutting out an inner side of a pressing surface so as to press a peripheral edge portion of the gasket; and
- a closing plug screw configured to be screwed into a female screw formed in an inner peripheral surface on an open end side from the step portion and press the pressing member toward the gasket by movement caused by screwing.

The closing plug reliably prevents leakage of internal fluid by causing the gasket to bite into the annular projection formed in the step portion of the open end of the flow passage block.

In this case, a tip end surface of the closing plug screw may be cut out on an inner side so as to press a peripheral edge portion of a pressed surface of the pressing member. Further, the pressing member may be a tip end portion of the closing plug screw.

Further, in this case, the gasket may be formed in a circular flat plate shape, and may have a fluid contact surface formed in a curved surface shape.

In addition, the gasket may be formed in an annular shape, and the pressing member may have a fluid contact surface formed in a curved surface shape.

In addition, a thermal sensor attachment hole may be formed in a rear end surface of the closing plug screw.

In addition, a fluid control device according to the invention made to solve the same problem includes:
- a fluid control apparatus;
- a flow passage block having a flow passage formed in an interior thereof in which the fluid control apparatus is attached; and
- the above closing plug configured to close an open end of a flow passage of the flow passage block.

Advantageous Effects of Invention

According to the invention, leakage of internal fluid can be reliably prevented by causing the gasket to bite into the annular projection formed in the step portion of the open end of the flow passage block to be, that is, in a throttled state. In addition, by shortening a length of a female screw portion formed in the inner peripheral surface on the open end side from the step portion, a size of the closing plug screw can also be reduced, and a protrusion from an end surface of the flow passage block does not need to be formed. Further, by forming the fluid contact surface in a curved surface shape, turbulence in fluid flowing through the flow passage and cavitation can be prevented.

BRIEF DESCRIPTION OF DRAWINGS

FIG. 1A to FIG. 1E are schematic views of a flow passage block attached with a closing plug according to an embodiment of the invention, in which

FIG. 2A, FIG. 2B and FIG. 2C are cross-sectional views showing the above closing plug, in which

FIG. 3A and FIG. 3B are cross-sectional views showing Embodiment 2 of the above closing plug, in which

FIG. 4A and FIG. 4B are cross-sectional views showing Embodiment 3 of the above closing plug, in which

FIG. 5A and FIG. 5B show examples of a closing plug in the related art, in which

DESCRIPTION OF EMBODIMENTS

Hereinafter, embodiments of the invention will be described in detail with reference to the drawings. The following embodiments are merely preferred examples in nature, and are not intended to limit the scope, applications, or use of the invention.

Embodiment 1

Figure 1A:
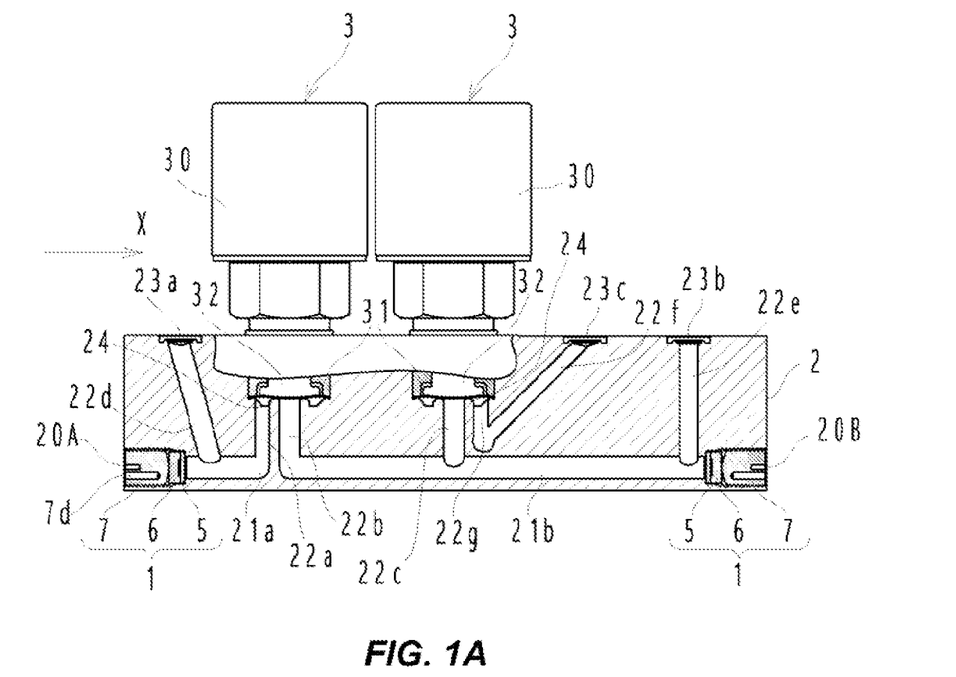
FIG. 1A is a cross-sectional view of a partly cut-out portion from the front.
Figure 1B:
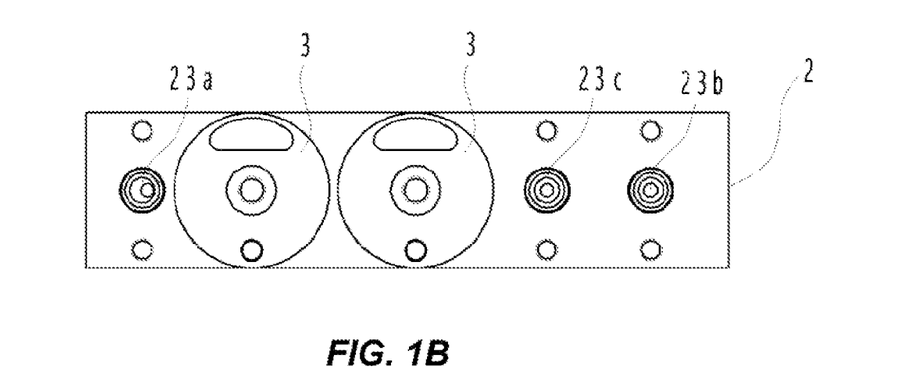
FIG. 1B is a plan view thereof.
Figure 1C:
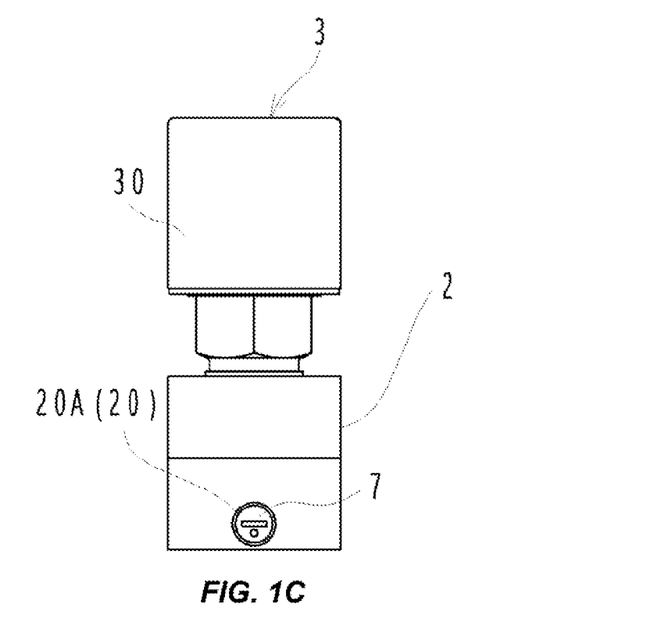
FIG. 1C is a left side view thereof.
Figure 1D:
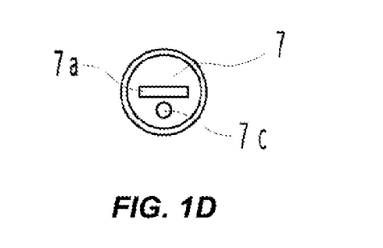
FIG. 1D and FIG. 1E are explanatory views showing a tool engagement portion of a closing plug screw.
Figure 1E:
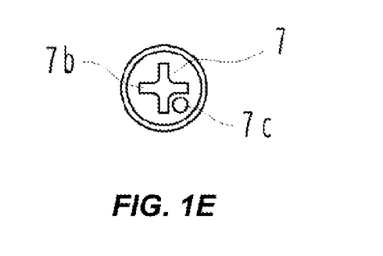
Figure 2A:
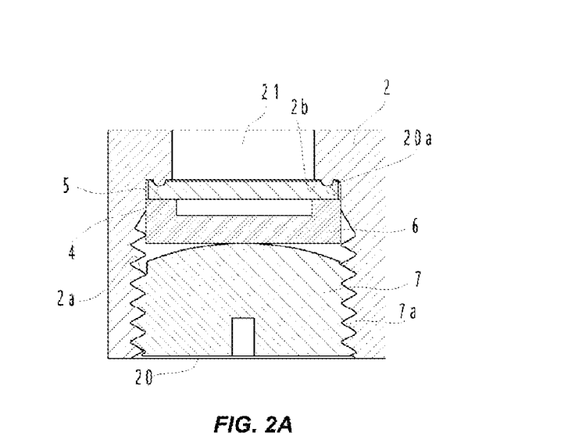
FIG. 2A is a basic view of Embodiment 1.
Figure 2B:
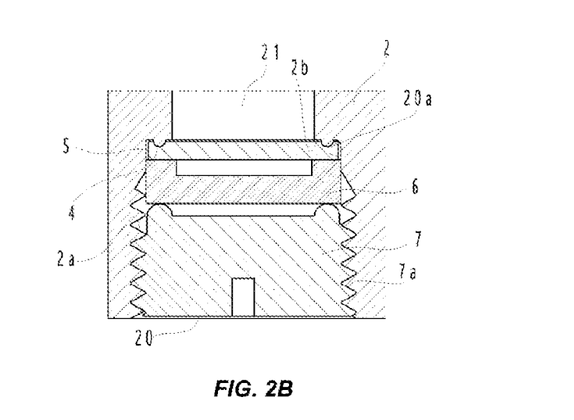
FIG. 2B shows an example in which a central portion of a tip end of a closing plug screw 7 is cut out in a circular shape.
Figure 2C:
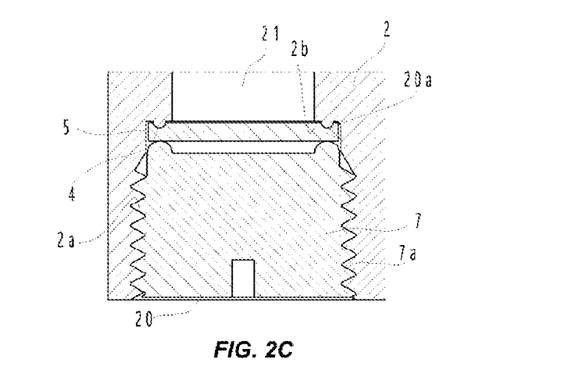
FIG. 2C shows an example in which a tip end of a closing plug screw also serves as a pressing member.

FIGS. 1 and 2 show Embodiment 1 of the invention.

A closing plug 1 is a closing plug that closes an open end 20 of a flow passage of a flow passage block 2 attached with a fluid control apparatus, for example, an on/off valve 3.

The closing plug 1 includes: a gasket 5 that comes into contact with an annular projection 20a formed in a step portion 2b inside the open end 20 (open ends 20A and 20B hereinafter simply referred to as open end 20 with reference to FIGS. 2 and 3) of a flow passage 21 of the flow passage block 2; a columnar pressing member 6 formed by cutting out an inner side of a pressing surface so as to press a peripheral edge portion of the gasket 5; and a closing plug screw 7 that is screwed into a female screw 2a formed in an inner peripheral surface 20a on an open end 20 side from the step portion 2b and presses the pressing member 6 toward the gasket 5 by movement caused by screwing.

[On/Off Valve]

The on/off valve 3 is configured with: a diaphragm 31 that comes into contact with and separates from an annular valve seat 24 formed on a bottom surface of a valve chamber connected to an open end of sub-flow passages 22a, 22b, and 22c provided orthogonally to the flow passage 21 of the flow passage block 2; a stem 32 that presses the diaphragm 31 toward the valve seat 24 side; and an actuator 30 that operates the stem 32.

The actuator 30 may be an electric actuator, an air actuator, or a manual actuator.

[Flow Passage Block]

The flow passage block 2 is attached with the fluid control apparatus such as the on/off valve 3 and supplies process gas into a chamber as the next process, and the flow passage block 2 of the present embodiment is configured such that three inflow/outflow ports 23a, 23b and 23c and two on/off valves can be attached thereto.

In the flow passage block 2 of the present embodiment, the three inflow/outflow ports 23a, 23b and 23c include an inflow port 23a connected to a process line, an outflow port 23b connected to the chamber or the like as the next process, and an inflow port 23c connected to a verge line.

The flow passage is configured with: a main flow passage 21 formed parallel to an X direction in the drawing; and sub-flow passages 22a, 22b, 22c, 22d, 22e and 22f formed at a predetermined angle or orthogonal to the main flow passage 21 and connected to the inflow/outflow ports 23a, 23b and 23c and the valve chamber.

A main flow passage 21a forming an open end 20A communicates with a sub-flow passage 22a, whose tip end is orthogonal to the main flow passage 21a from one valve chamber (valve chamber on the left in the drawing) of the flow passage block 2, such that an intersection portion thereof is a curved surface. In addition, a sub-flow passage 22d extending from the inflow port 23a communicates with an appropriate position of the main flow passage 21a.

Similarly, a main flow passage 21b forming an open end 20B communicates with a sub-flow passage 22b, whose tip end is orthogonal to the main flow passage 21b from one valve chamber of the flow passage block 2, such that an intersection portion thereof is a curved surface, and communicates with a sub-flow passage 22c orthogonal to the main flow passage 21b from another valve chamber (valve chamber on the right in the drawing) at an appropriate position. Further, a sub-flow passage 22e extending from the outflow port 23b communicates with an appropriate position of the main flow passage 21b.

In addition, a sub-flow passage 22f extending from the inflow port 23c connected to a purge line is connected to a sub-flow passage 22g extending from the other valve chamber. The sub-flow passages 22f and 22g do not interfere with the main flow passages 21a and 21b. A merging portion between end portions of the respective flow passages (for example, a merging portion where the main flow passage 21a and the sub-flow passage 22a are orthogonal to each other) is processed into a spherical surface (curved surface) using, that is, a ball end mill. Accordingly, turbulence of fluid flowing through the inside can be prevented.

The open ends 20A and 20B (hereinafter simply referred to as open end 20 with reference to FIGS. 2 and 3) of the main flow passages 21a and 21b (hereinafter simply referred to as main flow passages 21 with reference to FIGS. 2, 3, and 4) form the step portion 2b by forming a slightly larger diameter portion than the main flow passage 21, and form the female screw 2a on the inner peripheral surface 20a on the open end 20 side of the step portion 2b.

In addition, an annular projection 4 is formed on the annular step portion 2b. A tip end of the annular projection 4 is formed into a curved surface by a forming tool having a concave curved surface. A disk-shaped metallic seal member, for example, a gasket 5, is pressed against the annular projection 4 by the pressing member 6 to prevent fluid flowing through the main flow passage 21 from flowing out to the outside. In general, since it is not assumed that the open end 20 of the flow passage of the flow passage block 2 is opened again once closed, there is no problem in that the gasket 5 bites into the annular projection 4 and cannot be removed.

The pressing member 6 is pushed toward the gasket 5 by the closing plug screw 7, whose peripheral surface is formed with a male screw 7a, advancing by being screwed into the female screw 2a formed in the inner peripheral surface 20a. A central portion of a contact surface of the pressing member 6 with the gasket 5 is cut out in a circular shape, and only the annular surface of the outer periphery comes into contact with the gasket 5. Accordingly, a pressing force is concentrated on the annular projection 4.

A tip end of the closing plug screw 7 (contact surface with the pressing member 6) in FIG. 2A of FIG. 2 has been exemplified as a commercially available stop screw having a convex curved surface at the center, but may be shaped such that the central portion is cut out in a circular shape so as to concentrate the pressing force on the outer periphery, as shown in FIG. 2B.

Further, when the central portion of the tip end of the closing plug screw 7 is cut out in the circular shape, as shown in FIG. 2C, the pressing member 6 may be omitted, and the gasket 5 may be directly pressed by the closing plug screw 7.

As shown in FIG. 1D and FIG. 1E, the closing plug screw 7 can be formed with a temperature sensor attachment hole 7c for measuring a temperature in a flow passage in addition to a minus groove 7a and a plus groove 7b for engaging a tool on the opposite side of a pressing surface. The temperature sensor to be used is not particularly limited, but it is preferable to use a cylindrical thermistor temperature sensor in which an outer diameter of a sensor unit is about several mm (for example, 1 mm to 4 mm) and a length of the sensor unit is about 10 mm to 50 mm.

Embodiment 2

Figure 3A:
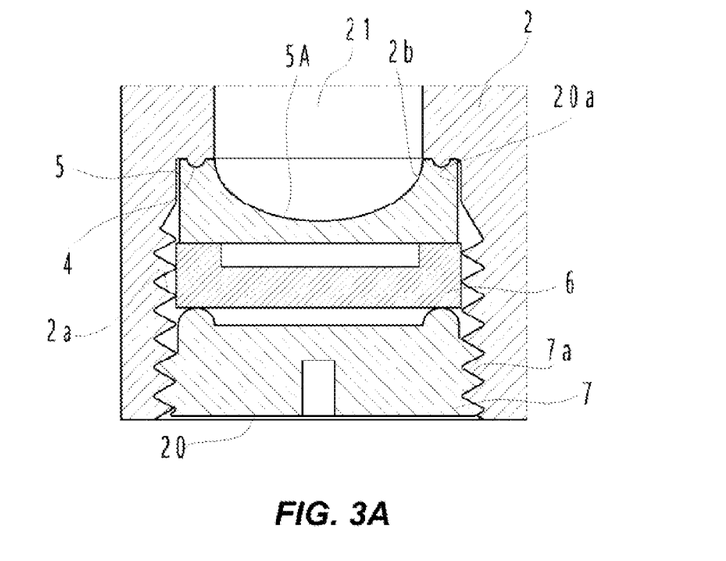
FIG. 3A is a basic view of Embodiment 2.
Figure 3B:
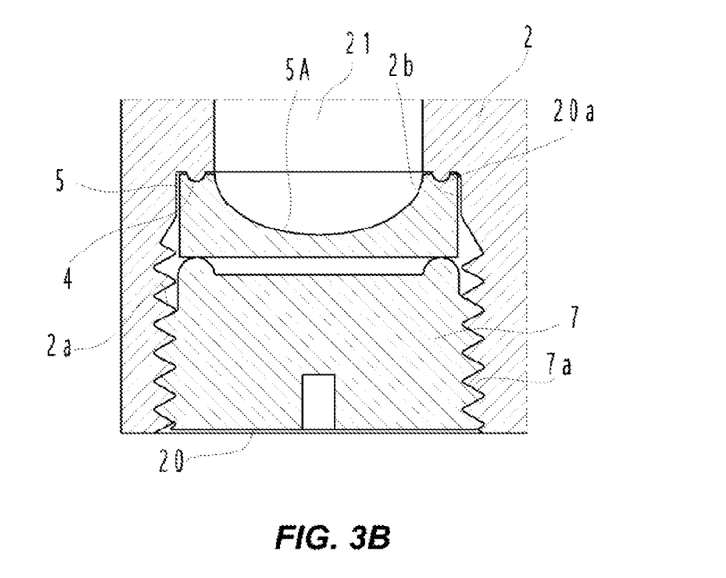
FIG. 3B shows an example in which a tip end of a closing plug screw also serves as a pressing member.

FIG. 3A and FIG. 3B show Embodiment 2 of the invention.

The flow passage block 2 and the on/off valve 3 of Embodiment 1 have the same configurations as those of the closing plug 1 of Embodiment 2, and descriptions thereof will be omitted. In the closing plug 1 of Embodiment 2, the gasket 5 is formed in a circular flat plate shape, and has a fluid contact surface on a flow passage 21 side formed in a curved surface shape 5A.

The curved surface shape 5A may be either a spherical surface or an ellipsoidal surface, and does not form a corner portion so as not to cause turbulence in fluid flowing through the inside of the flow passage 21.

FIG. 3A shows an example in which a pressing force of the closing plug screw 7 is applied to the gasket 5 via the pressing member 6, and FIG. 3B shows an example in which the central portion of the tip end of the closing plug screw 7 is formed in a spherical shape 5A, the pressing member 6 is omitted, and the gasket 5 is directly pressed by the closing plug screw 7 in a modification of Embodiment 2.

Embodiment 3

Figure 4A:
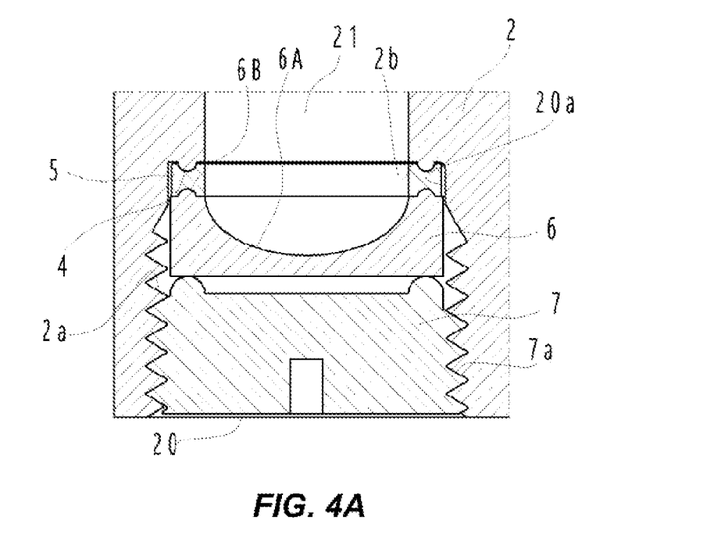
FIG. 4A is a basic view of Embodiment 3.
Figure 4B:
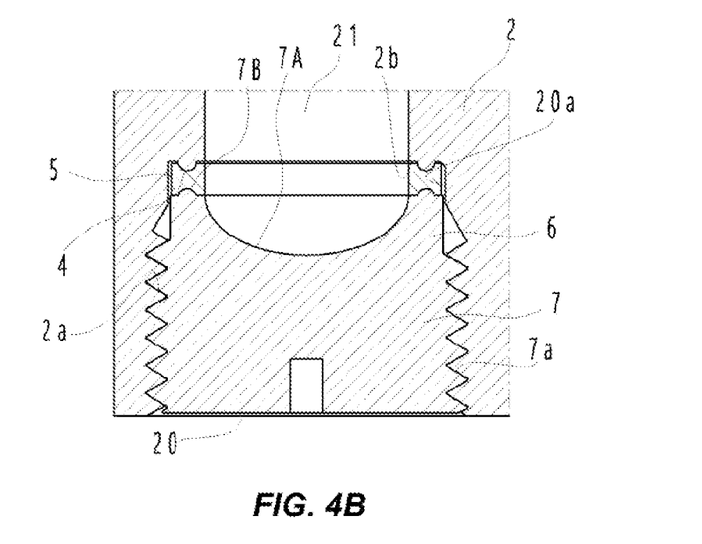
FIG. 4B shows an example in which a tip end of a closing plug screw also serves as a pressing member.

FIG. 4A and FIG. 4B show Embodiment 3 of the invention.

The flow passage block 2 and the on/off valve 3 of Embodiment 1 have the same configurations as those of the closing plug 1 of Embodiment 3, and the descriptions thereof will be omitted. In the closing plug 1 of Embodiment 3, the gasket 5 is formed in an annular shape, and the pressing member 6 has a fluid contact surface on the flow passage 21 side formed in a curved surface shape 6A.

In Embodiment 3 in which an annular gasket is used, an annular projection 6B is formed on a circumferential surface of the pressing member 6, which is the contact portion with the gasket 5, and the gasket 5 is sandwiched between the annular projection 4 formed on the step portion 2b and the annular projection 6B so that both the annular projections 4 and 6B bite into the gasket 5, thereby preventing leakage of the fluid flowing through the inside of the flow passage 21 to the outside.

FIG. 4B shows an example in which h the central portion of the tip end of the closing plug screw 7 is formed in a spherical shape 7A, the pressing member 6 is omitted, and the gasket 5 is directly pressed by the closing plug screw 7 in a modification of Embodiment 3. In this case, an annular projection 7B is formed on a circumferential surface of the closing plug screw 7, which is the contact portion with the gasket 5, and the gasket 5 is sandwiched between the annular projection 4 formed in the step portion 2b and the annular projection 7B so that both the annular projections 4 and 7B bite into the gasket 5, thereby preventing leakage of the fluid flowing through the inside of the flow passage 21 to the outside.

Embodiment 4

Embodiment 4 is a fluid control device including the fluid control apparatus such as the above on/off valve 3, the flow passage block 2, and the on/off valves of Embodiment 1 to Embodiment 3.

In the fluid control device, for example, as shown in FIG. 1A, two on/off valves 3 are placed on an upper surface of the flow passage block 2. When the on/off valve 3 on the left in the drawing is opened, the on/off valve on the right is closed, and process gas is delivered from the inflow port 23a to the chamber as the next process through the outflow port 23b. After a predetermined amount of the process gas is introduced into the chamber and the process in the chamber is completed, the on/off valve on the right is opened, and purge gas is introduced from the inflow port 23c to clean the inside of the flow passage 21. It is needless to say that the fluid control device of the invention is not limited to this example, and can also be applied to a device in which a mass flow controller is placed as a fluid control apparatus as long as it is a flow passage block having an open end that requires closing.

The present international application claims priority based on Japanese Patent Application No. 2020-182009 filed on Oct. 30, 2020, and incorporates entire contents of Japanese Patent Application No. 2020-182009 in the present international application.

INDUSTRIAL APPLICABILITY

As described above, the closing plug of the invention can easily close an open end of a flow passage without concern of scale, and can be suitably used as a closing plug of various flow passage blocks mounted with a fluid control apparatus.

REFERENCE SIGNS LIST

1: closing plug
2: flow passage block
20: open end
21: flow passage
3: on/off valve
5: gasket
6: pressing member
7: closing plug screw

The invention claimed is:

1. A closing plug for closing an open end of a flow passage of a flow passage block attached with a fluid control apparatus, the closing plug comprising:
   a gasket configured to come into contact with an annular projection formed in a step portion inside the open end of the flow passage;
   a columnar-shaped pressing member with a bottom formed by cutting out an inner side of a pressing surface so as to press a peripheral edge portion of the gasket; and
   a closing plug screw configured to be screwed into a female screw formed in an inner peripheral surface on an open end side from the step portion and press the pressing member toward the gasket by movement caused by screwing.

2. The closing plug according to claim 1, wherein a tip end surface of the closing plug screw is cut out on an inner side so as to press a peripheral edge portion of a pressed surface of the pressing member.

3. The closing plug according to claim 1, wherein the pressing member is a tip end portion of the closing plug screw.

4. The closing plug according to claim 1 wherein the gasket is formed in a circular flat plate shape, and has a fluid contact surface formed in a curved surface shape.

5. The closing plug according to claim 1 wherein the gasket is formed in an annular shape, and the pressing member has a fluid contact surface formed in a curved surface shape.

6. The closing plug according to claim 1, wherein a temperature sensor attachment hole is formed in a rear end surface of the closing plug screw.

7. A fluid control device comprising:
   a fluid control apparatus;
   a flow passage block having a flow passage formed in an interior thereof in which the fluid control apparatus is attached; and
   the closing plug according to claim 1 configured to close an open end of a flow passage of the flow passage block.

8. The closing plug according to claim 2, wherein the gasket is formed in a circular flat plate shape, and has a fluid contact surface formed in a curved surface shape.

9. The closing plug according to claim 3, wherein the gasket is formed in a circular flat plate shape, and has a fluid contact surface formed in a curved surface shape.

10. The closing plug according to claim 2, wherein the gasket is formed in an annular shape, and the pressing member has a fluid contact surface formed in a curved surface shape.

11. The closing plug according to claim 3, wherein the gasket is formed in an annular shape, and the pressing member has a fluid contact surface formed in a curved surface shape.

12. The closing plug according to claim 2, wherein a temperature sensor attachment hole is formed in a rear end surface of the closing plug screw.

13. The closing plug according to claim 3, wherein a temperature sensor attachment hole is formed in a rear end surface of the closing plug screw.

14. The closing plug according to claim 4, wherein a temperature sensor attachment hole is formed in a rear end surface of the closing plug screw.

15. The closing plug according to claim 5, wherein a temperature sensor attachment hole is formed in a rear end surface of the closing plug screw.

16. A fluid control device comprising:
   a fluid control apparatus;
   a flow passage block having a flow passage formed in an interior thereof in which the fluid control apparatus is attached; and
   the closing plug according to claim 2 configured to close an open end of a flow passage of the flow passage block.

17. A fluid control device comprising:
   a fluid control apparatus;
   a flow passage block having a flow passage formed in an interior thereof in which the fluid control apparatus is attached; and
   the closing plug according to claim 3 configured to close an open end of a flow passage of the flow passage block.

18. A fluid control device comprising:
   a fluid control apparatus;
   a flow passage block having a flow passage formed in an interior thereof in which the fluid control apparatus is attached; and
   the closing plug according to claim 4 configured to close an open end of a flow passage of the flow passage block.

19. A fluid control device comprising:
   a fluid control apparatus;
   a flow passage block having a flow passage formed in an interior thereof in which the fluid control apparatus is attached; and
   the closing plug according to claim 5 configured to close an open end of a flow passage of the flow passage block.

20. A fluid control device comprising:
   a fluid control apparatus;
   a flow passage block having a flow passage formed in an interior thereof in which the fluid control apparatus is attached; and
   the closing plug according to claim 6 configured to close an open end of a flow passage of the flow passage block.

* * * * *